(12) United States Patent
St-Jean et al.

(10) Patent No.: US 10,540,787 B2
(45) Date of Patent: Jan. 21, 2020

(54) AUTOMATED TREND CHART GRAPHICAL DISPLAY GENERATION IN A HISTORIAN SYSTEM

(71) Applicant: AVEVA Software, LLC, Lake Forest, CA (US)

(72) Inventors: André St-Jean, Québec (CA); Alexis Thériault, Québec (CA)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 396 days.

(21) Appl. No.: 15/491,716

(22) Filed: Apr. 19, 2017

(65) Prior Publication Data

US 2018/0307403 A1    Oct. 25, 2018

(51) Int. Cl.
*G06F 3/048* (2013.01)
*G06T 11/00* (2006.01)
*G06T 11/20* (2006.01)

(52) U.S. Cl.
CPC .......... *G06T 11/001* (2013.01); *G06T 11/206* (2013.01); *G06T 2200/24* (2013.01)

(58) Field of Classification Search
CPC .. G06T 11/001; G06T 11/206; G06T 2200/24
USPC .......................................................... 715/772
See application file for complete search history.

(56) References Cited

U.S. PATENT DOCUMENTS

| 7,308,309 | B1 * | 12/2007 | Koh | A61B 5/0452 |
| | | | | 607/17 |
| 9,386,107 | B1 * | 7/2016 | Browning | G06Q 50/01 |
| 9,498,164 | B2 * | 11/2016 | Johnson | A61B 5/14532 |
| 9,504,430 | B2 * | 11/2016 | Johnson | A61B 5/14532 |
| 9,552,399 | B1 * | 1/2017 | Browning | G06Q 50/01 |
| 2012/0005045 | A1 * | 1/2012 | Baker | G06Q 30/0643 |
| | | | | 705/27.2 |
| 2018/0307403 | A1 * | 10/2018 | St-Jean | G06T 11/206 |
| 2018/0366221 | A1 * | 12/2018 | Crehore | G16H 70/00 |

\* cited by examiner

*Primary Examiner* — David Phantana-angkool
(74) *Attorney, Agent, or Firm* — Greenberg Traurig, LLP

(57) ABSTRACT

Automated generation of graphical displays of industrial process data tags including three trend charts for each data tag. The displays include trend charts for the time-weighted average, the minimum value, and the maximum value over a predetermined time period. Altering the transparency of the trend charts for the minimum value and maximum value enables displaying data for multiple tags on a single chart.

20 Claims, 11 Drawing Sheets

Notify me when
Exterior Humidity is not equal to

Value is greater than
is greater or equal to
is equal to
is not equal to
is less than
is less or equal to
is not between

802

AUTOMATED TREND CHART GRAPHICAL DISPLAY GENERATION IN A HISTORIAN SYSTEM

TECHNICAL FIELD

Aspects of the present disclosure generally relate to the fields of networked computerized industrial control, automation systems, networked computerized systems utilized to monitor, log, and display relevant manufacturing/production events and associated data, and supervisory level control and manufacturing systems. More particularly, aspects relate to systems and methods that convey the trend of tag data values over time and individual tag data values that exceed alert thresholds.

BACKGROUND

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element (e.g., tag) by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface (HMI). Examples of such systems are the well-known Wonderware INTOUCH™ HMI software system for visualizing and controlling a wide variety of industrial processes and the ArchestrA™ (e.g., the application server or AppServer for INTOUCH™) comprehensive automation and information software open architecture designed to integrate and extend the life of legacy systems by leveraging the latest, open industry standards and software technologies.

Known HMIs render alert notifications based on averaged data values, which may unfortunately result in failure to alert users to certain conditions. Moreover, known HMIs and those that use conventional approaches (e.g., candlestick charts, bar charts) are unable to render graphical displays that include representations for a plurality of tags.

SUMMARY

Aspects of the disclosure generate graphical displays including three trend charts for each data tag (e.g., VTQ). The displays include trend charts for the time-weighted average, the minimum value, and the maximum value over a predetermined time period. Altering the transparency of the trend charts for the minimum value and maximum value enables displaying data for multiple tags on a single chart.

In an aspect, an automated graphical display generation system includes a display device, a processor, and processor-executable instructions stored on a computer-readable storage medium. When executed by the processor, the instructions generate a graphical user interface on the display device. The automated graphical display generation system receives a query time period selection via a query graphical user interface of the display device. Time-weighted average data values, minimum data values, and maximum data values are retrieved from an industrial process historian device communicatively coupled to the automated graphical display generation system via a communications network. Each retrieved time-weighted average data value represents a time-weighted average of data values captured during each of a plurality of intervals of the query time period. Each retrieved minimum data value represents a minimum data value captured during each interval and each retrieved maximum data value represents a maximum data value captured during each interval. In response to retrieving the time-weighted average data values, the minimum data values, and the maximum data values, the automated graphical display generation system generates a graphical user interface on the display device. The generated graphical user interface includes a time-weighted average trend line for the retrieved time-weighted average data values, a minimum trend line for the retrieved minimum data values, and a maximum trend line for the retrieved maximum data values.

In another aspect, a computer-implemented method includes receiving a query time period via a graphical user interface of a display device. The received time period is divided into intervals and the number of intervals is dependent upon a display resolution of the display device. A time-weighted average data value, a minimum data value, and a maximum data value are retrieved for each interval from an industrial process historian device via a communications network. Each retrieved time-weighted average data value represents a time-weighted average of the data values captured during the interval. In response to retrieving the data values, a display is generated on the display device. The display includes a time-weighted average trend chart for the retrieved time-weighted average data values, a minimum trend chart for the retrieved minimum data values, and a maximum trend chart for the retrieved maximum data values.

In yet another aspect, a computer readable storage device stores processor readable instructions that, when executed by a processor, implement a method of automatically generating a graphical display for time series data. The method includes receiving a query time period selection, a first tag selection, and a second tag selection via a graphical user interface of a display device. The first and second tags are each one of a plurality of tags of an industrial process historian. The received query time period is divided into intervals and the number of intervals is based upon a display resolution of the display device. A first time-weighted average data value, a first minimum data value, and a first maximum data value for each interval are each retrieved from the industrial process historian via the communications network. Each retrieved first time-weighted average data value represents a time-weighted average of the data values for the first tag captured during the interval. Each retrieved first minimum data value represents a minimum data value for the first tag captured during the interval. Each retrieved first maximum data value represents a maximum data value for the first tag captured during the interval. A second time-weighted average data value, a second minimum data value, and a second maximum data value for each interval are each retrieved from the industrial process historian via the communications network. Each retrieved second time-weighted average data value represents a time-weighted average of the data values for the second tag captured during the interval. Each retrieved second minimum data value represents a minimum data value for the second tag captured during the interval. Each retrieved second maximum data value represents a maximum data value for the second tag captured during the interval. In response to retrieving the first time-weighted average data values, the first minimum data values, the first maximum data values, the second time-weighted average data values, the second minimum data values, and the second maximum data values, a graphical display is generated. The graphical display includes a first time-weighted average trend chart for the retrieved first time-weighted average data values, a first minimum trend chart for the retrieved first minimum data values, a first maximum trend chart for the retrieved first maximum data values, a second time-weighted average trend chart for the retrieved second time-weighted average data values, a second minimum trend chart for the retrieved second minimum data values, and a second maximum trend chart for the retrieved second maximum data values. The first time-weighted trend chart, minimum trend chart, and maximum trend chart have a first color on the graphical display, and the second time-weighted average trend chart, minimum trend chart, and maximum trend chart have a second color on the graphical display.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
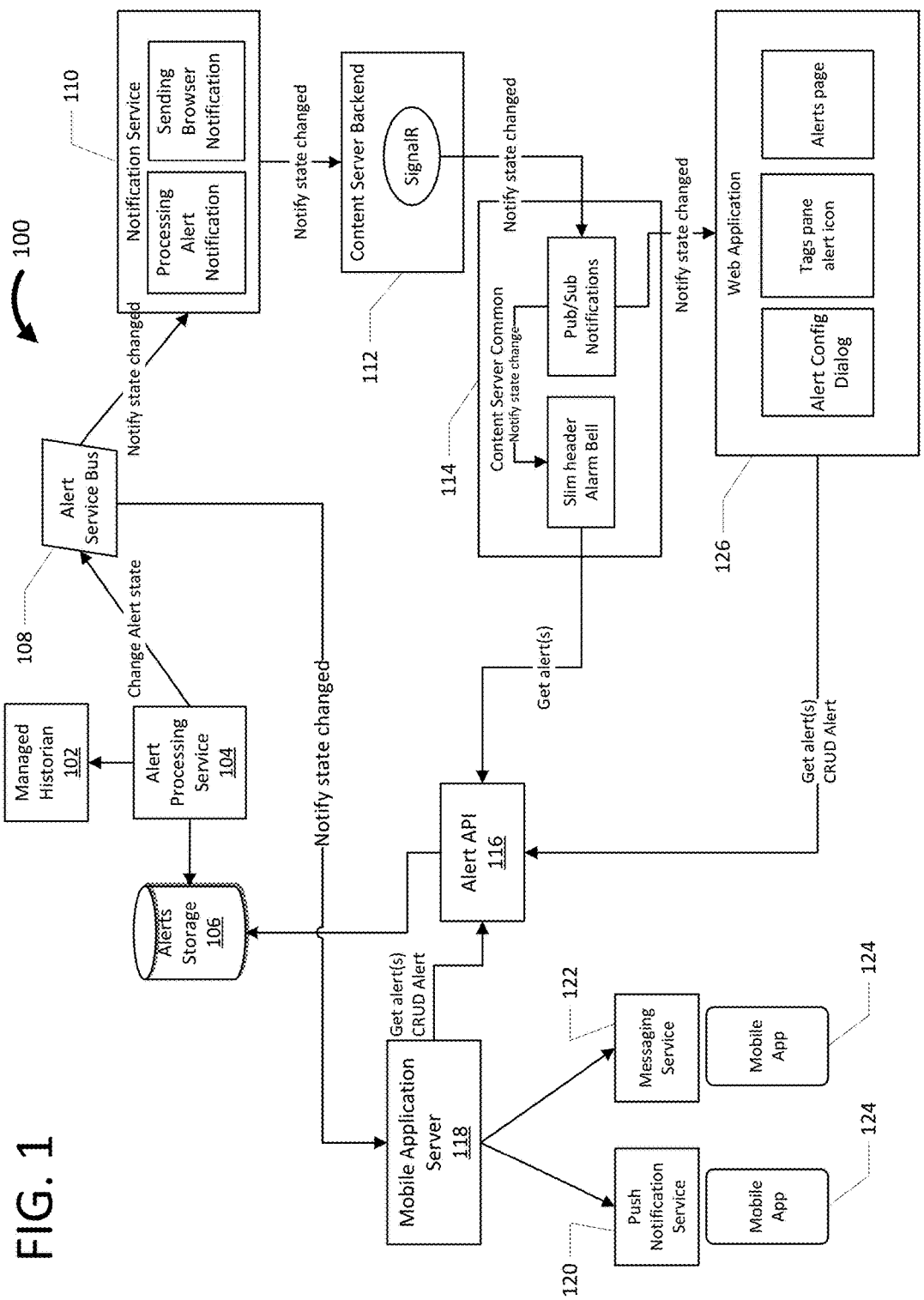
FIG. 1 is a block diagram illustrating exemplary automated generation of graphical displays according to an embodiment.

FIG. 1 illustrates an exemplary system and process, generally indicated at 100, for generating a display of time series data (e.g., tag data values) in accordance with an embodiment of the disclosure. The system includes a managed historian 102, an alert processing service 104, an alert database 106, an alert service data bus 108, a notification service 110, a content server backend 112, a content server common 114, an alert application programming interface (API) 116, a mobile application server 118, a push notification service 120, a messaging service 122, mobile applications 124 executing on mobile computing devices, and a web application 126 executing on a computing device.

The managed historian 102 is configured to store data representative of aspects of an industrial process (e.g., industrial data, Key Performance Indicators (KPIs)), etc.). The alert processing service 104 is configured to monitor data stored in managed historian 102 for relevance to one or more alerts stored in alert database 106. In an exemplary embodiment, alert database 106 includes a rule to generate an alert when a data value for a specific property exceeds a threshold value and alert processing service 104 continuously monitors data stored in managed historian 102 for the property and changes an alert state when the data exceeds the threshold value. Additional details regarding alerts are described herein. The alert processing service 104 notifies notification service 110 and/or mobile application server 118 of the changed alert state via the alert service bus 108. In an embodiment, mobile application server 118 utilizes the push notification service 120 (e.g., Apple push notification service for devices executing iOS operating systems, etc.) and/or the messaging service 122 (e.g., Google cloud messaging service for devices executing Android operating systems, etc.) to transmit alerts to mobile applications 124 (e.g., Wonderware SmartGlance) executing on mobile computing devices within an aspect of the disclosure. In another embodiment, notification service 110 forwards the state change notification to the content server common 114 via the content server backend 112 (e.g., SignalR, etc.). In accordance with an aspect of the disclosure, a publication/subscription component of content server common 114 receives the state change notification and sends an alert to alert API 116 via a slim header alarm bell component and/or notifies web application 126 (e.g., executing within a browser application) of the state change. In an embodiment, the alert API 116 is configured to receive CRUD alerts from mobile applications 124 executing on mobile computing devices and/or web application 126 and store them in alert database 106. In an aspect, content server backend 112 and the publication/subscription component comprise a push model but one of ordinary skill in the art will understand that system and process 100 may utilize a pull model of data retrieval in accordance with one or more embodiments.

In an embodiment, the applications (e.g., mobile applications 124, web application 126, etc.) configure the computing devices executing the applications to generate displays, as further described herein, including industrial data and/or KPIs stored in managed historian 102. In accordance with an aspect of the disclosure, the generated displays display data in real-time to enable real-time decision making. An exemplary application includes, but is not limited to, Wonderware SmartGlance available from Schneider Electric. In an embodiment, the applications enable users to configure and personalize alerts within alert processing service 104 and receive proactive notifications about manufacturing and industrial facilities, processes, and/or equipment. The alert processing service 104 evaluates all sampling data (i.e., not only average data values) in managed historian 102 at predetermined intervals (e.g., at least once every minute, etc.) to provide timely alert notifications to the applications executing on computing devices, in accordance with an embodiment of the disclosure.

The applications, when executed by computing devices, are configured to retrieve historical data from managed historian 102 in the form of time series data, such as Value, Time, and Quality (VTQ) data. In an embodiment, the applications retrieve historical data for a query time period. The query time period may be a default time period defined by the applications or user-defined. For example, the query time period includes data from the last hour, last day, last three days, last week, up to last thirty days, and the like. The applications enable users to configure alert rules on time series data stored in managed historian 102. In an embodiment, alert rules are configured and stored in alert processing service 104 and/or alert database 106. Exemplary alert conditions include, but are not limited to, when the value is greater than a threshold value, less than a threshold value, within a specified range of values, and/or outside a specified range of values as further described herein. The alert processing service 104 is configured to evaluate the alert rules stored in alert database 106 at a predetermined frequency (e.g., once every minute, etc.) on all data stored in managed historian 102 for the particular form (e.g., VTQ) within the previous predetermined period (e.g., last minute, etc.).

Figure 2:
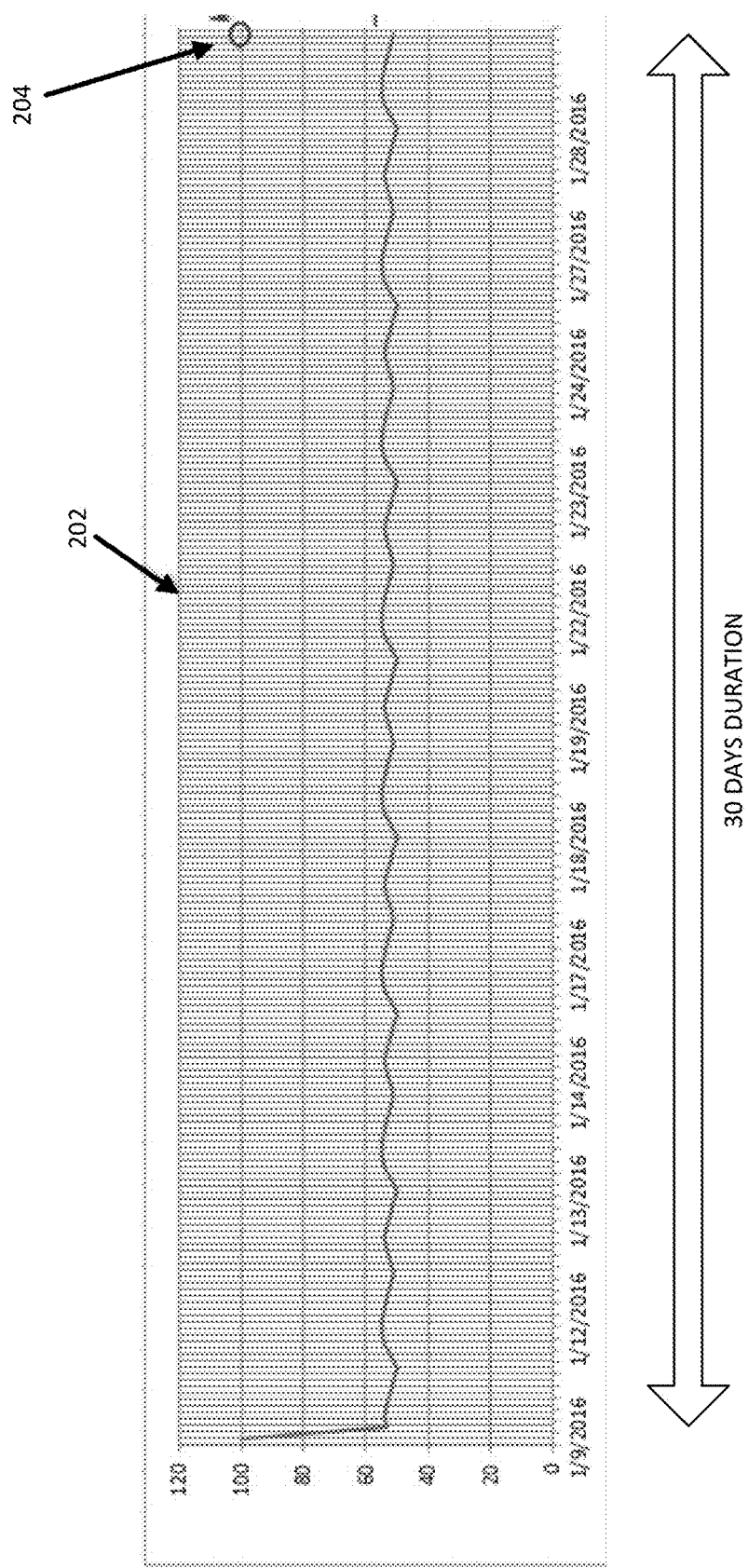
FIG. 2 illustrates an average trend chart with an alert outside of the trend line.

The applications also generate displays including the retrieved data displayed on a trend chart and/or in a grid as further described herein. In an embodiment, the number of data points that can be charted on the display are limited by the screen resolution of the computing device. For example, charting all data points on a single display (e.g., static, without requiring scrolling, etc.) may prevent the ability to make distinctions between the data points. In accordance with an aspect of the disclosure, the applications divide the query time period into a predetermined number of intervals and retrieve a time-weighted average of data values for each interval. For example, when the query time period is thirty days each interval is six hours (i.e., 720 hours divided into 120 intervals) and the applications generate a display plotting the average data value for each six-hour interval. In an embodiment, the applications generate a static display such that all plotted data values are displayed on a single screen and/or window and does not require scrolling. An exemplary number of intervals includes, but is not limited to, between about 120 and 250 intervals. One of ordinary skill in the art will understand that the number of intervals is dependent upon resolution of the display device and may be more than 250 (e.g., up to 1000 intervals) in one or more embodiments. FIG. 2 illustrates an exemplary trend chart for a query time period of thirty days with six-hour intervals 202.

In an embodiment, plotting a trend chart based on time-weighted average data values does not include any visual representation of data values that exceed alert thresholds, as illustrated at 204 in FIG. 2. Because the charted trend line is a time-weighted average, the sample that triggered the alert may be located either above or below the chart. Accordingly, the display will not accurately convey to a user why the alert was triggered because the data on the time-weighted average trend chart does not reflect the fact that some values went outside of the defined alert threshold value. Moreover, the display will not accurately convey to a user trend charts and/or data values that exceed alert thresholds for a plurality of VTQs.

Figure 3:
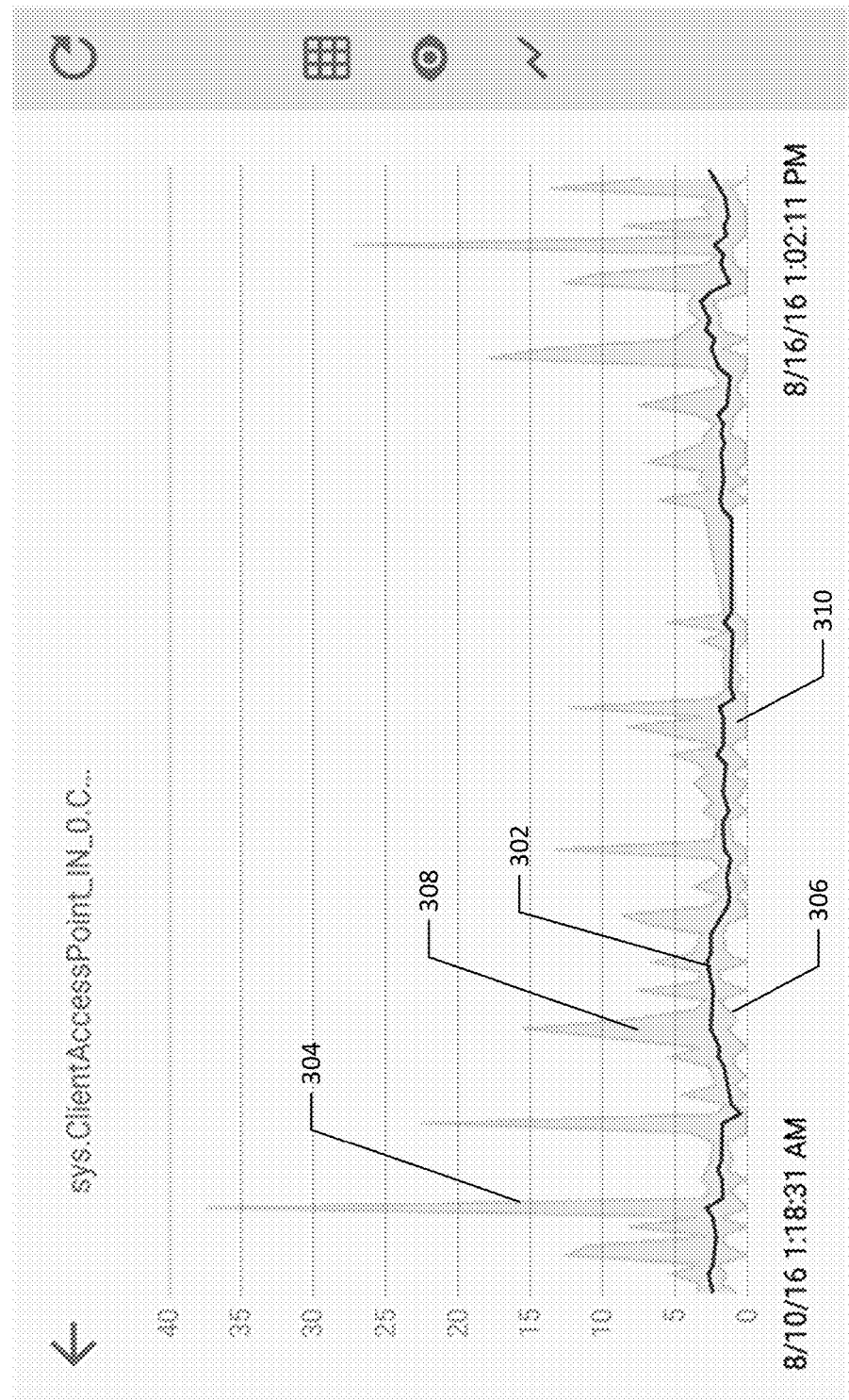
FIG. 3 is a screenshot illustrating an exemplary graphical display including three trend lines according to an embodiment.

FIG. 3 illustrates an exemplary graphical user interface (GUI) display 300 generated by system and process 100 including three trend charts for each VTQ in accordance with an aspect of the disclosure. An average trend chart 302 represents the actual time-weighted average for each interval, a maximum trend chart 304 represents the maximum data value for each interval, and a minimum trend chart 306 represents the minimum data value for each interval. In an embodiment, the average trend chart 302, maximum trend chart 304, and minimum trend chart 306 for each VTQ have the same color (i.e., hue), and the maximum trend chart 304 and minimum trend chart 306 are paler (i.e., have less luminance) than the average trend chart 302. In this manner, the display gives priority to displaying the time-weighted average for each VTQ while still displaying the maximum and minimum data values in a subordinate manner. In another embodiment, a maximum trend channel 308 between average trend chart 302 and maximum trend chart 304 and a minimum trend channel 310 between average trend chart 302 and minimum trend chart 306 are filled with the same paler color but with a high transparency percentage (e.g., about 75%). Accordingly, graphical displays within an aspect of the disclosure give priority to the average trend chart 302 and still include the maximum (e.g., maximum trend chart 304 and maximum trend channel 308) and minimum (e.g., minimum trend chart 306 and minimum trend channel 310) without being preeminent.

Figure 4:
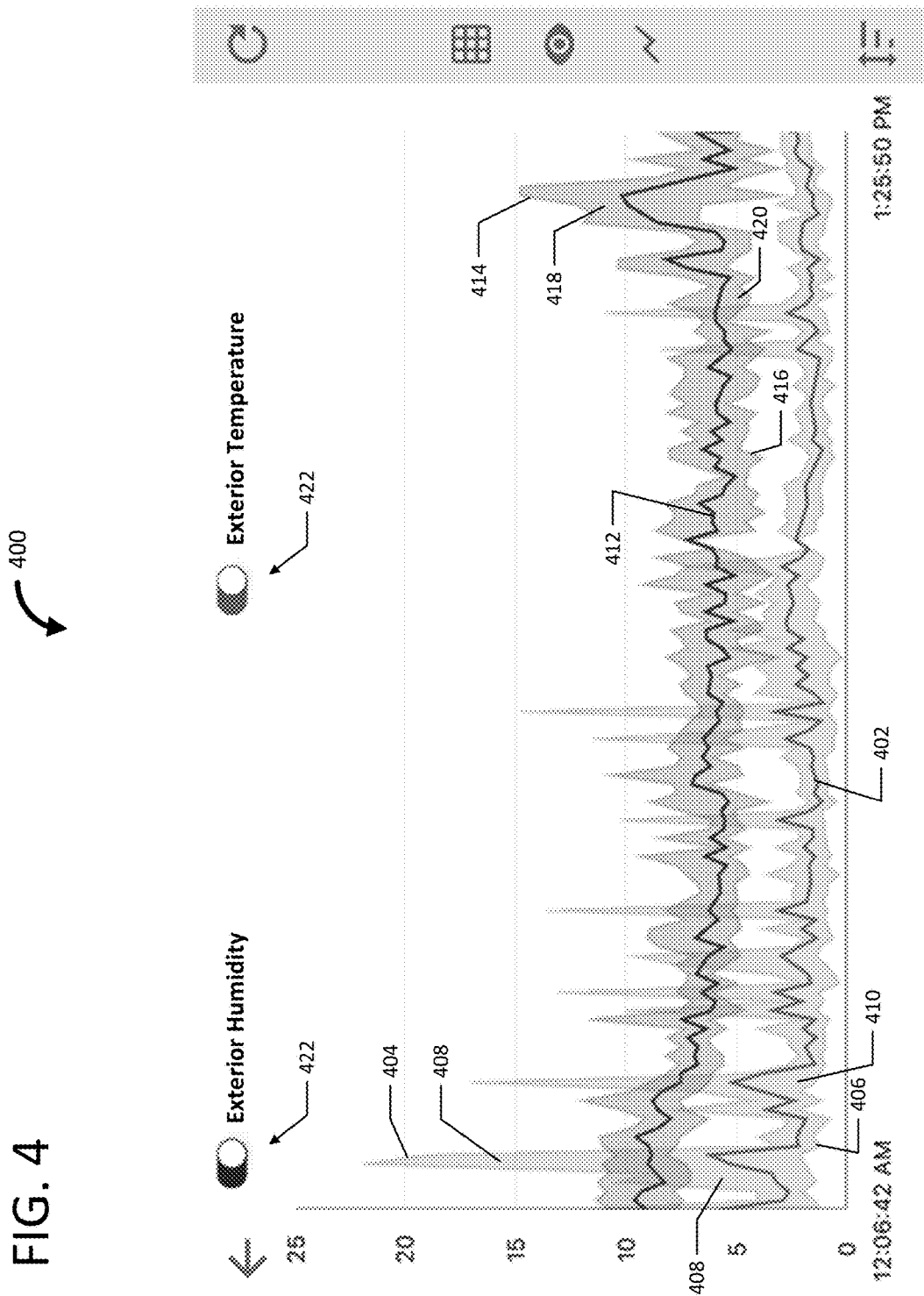
FIGS. 4 and 5 are screenshots illustrating exemplary graphical displays including three trend lines for each of a plurality of tags according to an embodiment.

Utilizing transparency enables displaying a plurality of VTQs, each having their own color (e.g., one red, one blue, etc.), on the same chart display as illustrated by FIG. 4. In FIG. 4, a display 400 includes a first property (e.g., temperature) includes a first average trend chart 402, a first maximum trend chart 404, a first minimum trend chart 406, a first maximum trend channel 408, and a first minimum trend channel 410, and a second property (e.g., humidity) includes a second average trend chart 412, a second maximum trend chart 414, a second minimum trend chart 416, a second maximum trend channel 418, and a second minimum trend channel 420. In an embodiment, the transparency of the first maximum trend chart 404 and the first maximum trend channel 408 enables each to overlap the second average trend chart 412, the second maximum trend chart 414, the second minimum trend chart 416, the second maximum trend channel 418, and the second minimum trend channel 420 without obscuring them.

Figure 5:
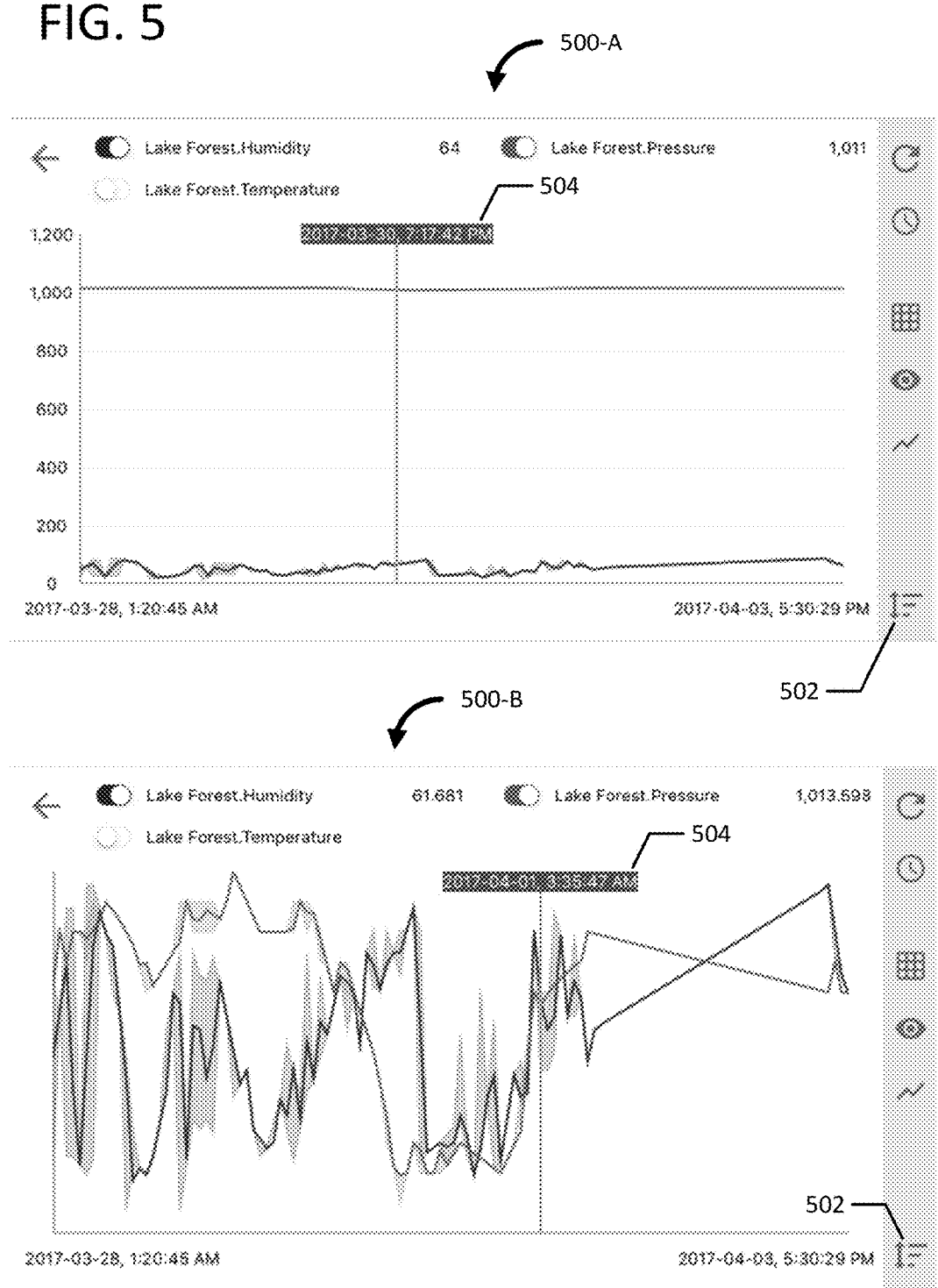

As illustrated in FIG. 4, trend charts have a common y-axis and identical scale in an embodiment. In another embodiment, as illustrated in FIG. 5, selection of an axis toggle button 502 generates a display 500-B in which the trend charts each have their own y-axis (e.g., no common y-axis) and take maximum space on the chart. The displays 500-A and 500-B each include two tags, one for pressure and one for humidity. In this example, the pressure is around 1,000 and the humidity varies between 0% and 100%. The display 500-A includes a common y-axis (e.g., from 0 to 1,200) and the trend charts for the pressure and humidity do not overlap at all. Thus, display 500-A depicts the absolute difference between the pressure and humidity, but not much of the fluctuation. The display 500-B does not have a common y-axis and depicts the two charts at full scale on top of each other. The y-axis in display 500-B does not include numbers. The display 500-B includes an indication of values for each trend via a scooter 504.

The embodiments illustrated in FIGS. 4 and 5 include two sets of time-series data (e.g., VTQs) but one of ordinary skill in the art will understand that displays including additional sets of time-series data are within the scope of the present disclosure. In an exemplary embodiment, displays 400 and 500 include charts (e.g., average trend charts, minimum trend charts, maximum trend charts, etc.) for up to six sets of time-series data. In another embodiment, the number of charts displayed is dependent upon the data. For example, six charts might be too crowded in an embodiment, but three or four charts may provide a display that is easily visually perceptible. In an embodiment, charts for certain sets of time-series data can be toggled on and off by selection (e.g., tapping, etc.) of one or more toggles 422 in a legend adjacent the chart for each set of time-series data.

Figure 6:
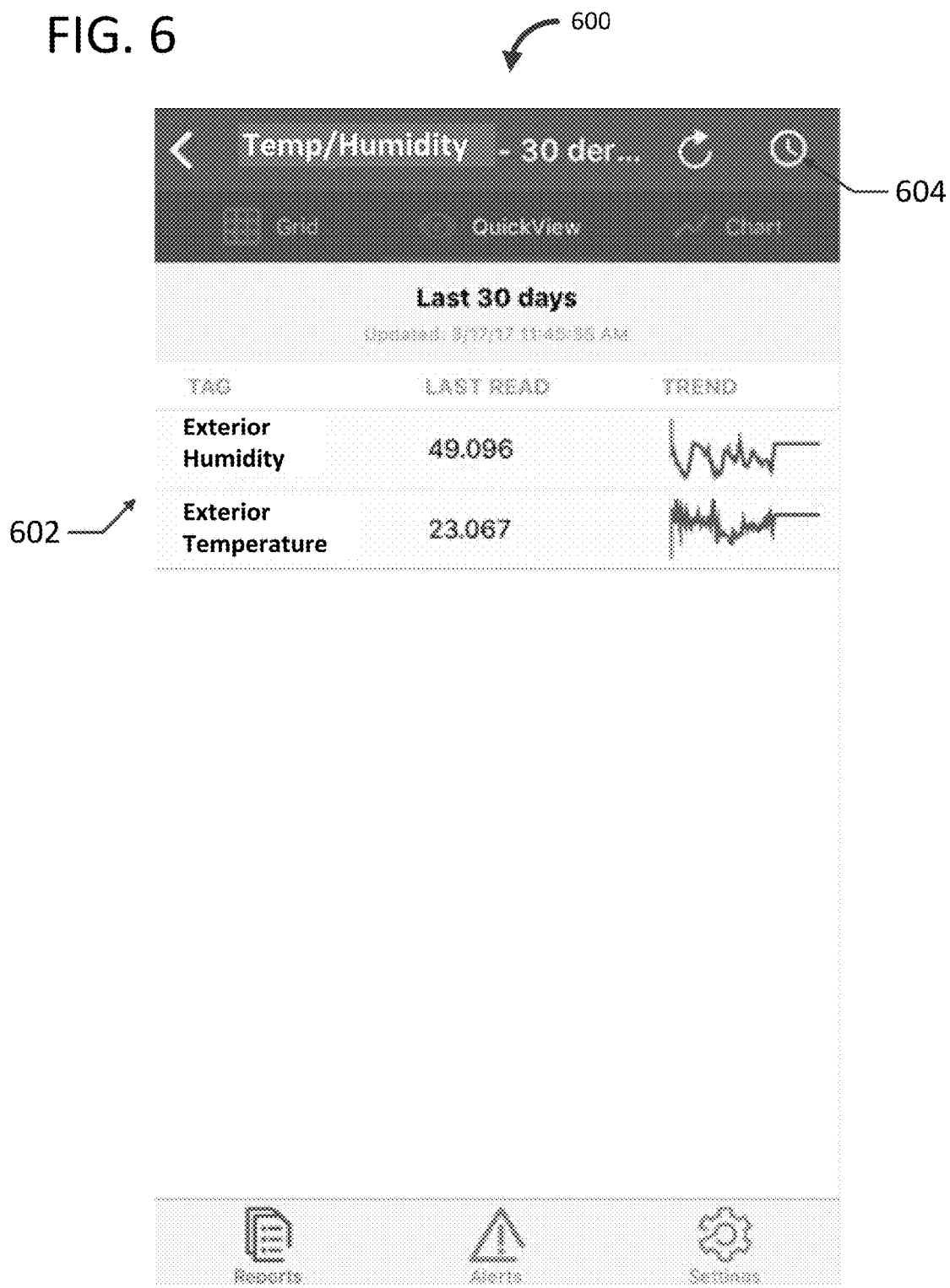
FIGS. 6 and 7 are screenshots illustrating exemplary graphical displays including a listing of tags according to an embodiment.
Figure 7:
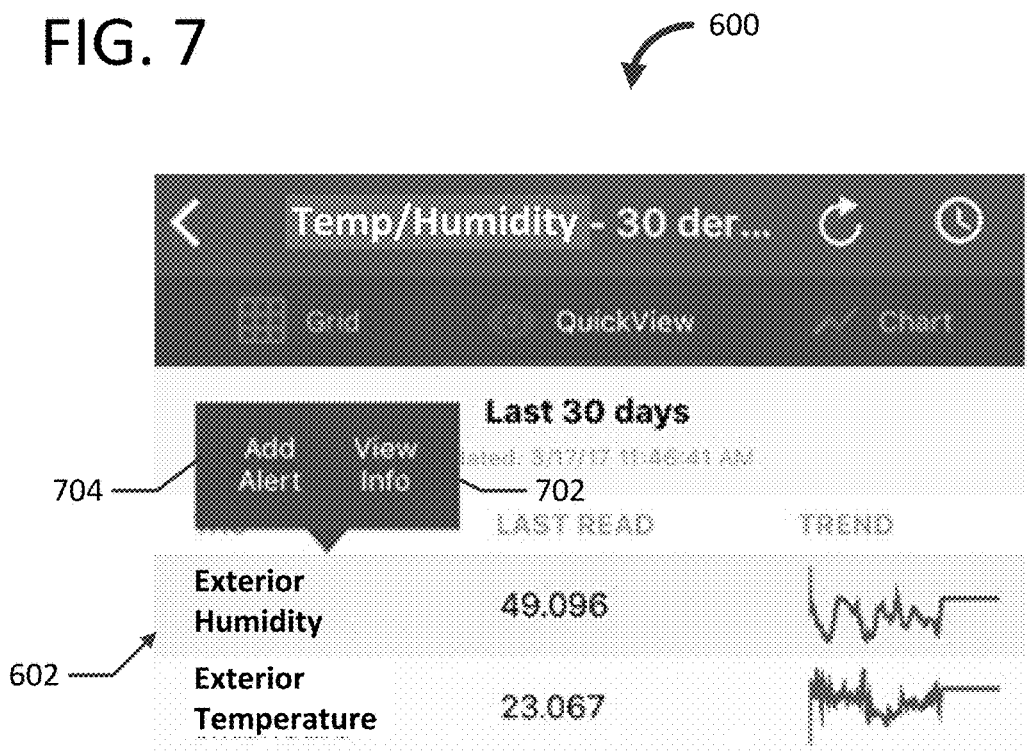

FIG. 6 illustrates an exemplary GUI display 600 including selectable tags 602 in accordance with an aspect of the disclosure. Via the GUI display 600 and a display device (e.g., touchscreen of a mobile computing device, display of a laptop computing device, etc.), aspects of the present disclosure are configured to receive a selection of one or more tags 602 and in response generate a display (e.g., display 300, 400, 500, etc.) including trend charts and/or channels for the selected tags. As illustrated in FIG. 7, in response to selection of one or more tags 602 (e.g., via right-click, long tap, etc.) GUI display 600 includes a selectable option 702 to view information about the selected tag and/or a selectable option 704 to add an alert for the selected tag.

Figure 8:
FIG. 8 is a screenshot illustrating an exemplary graphical display including conditions for creating an alert according to an embodiment.

In response to selection of option 704 to add an alert, aspects of the present disclosure generate an exemplary GUI display 800 (FIG. 8) for creating an alert threshold. Via the GUI display 800 and a display device (e.g., touchscreen of a mobile computing device, display of a laptop computing device, etc.), aspects of the present disclosure are configured to receive a selection of one or more rules 802 and in response generate an alert to store in alert database 106. In an embodiment, only one rule can be selected per tag, but certain rules (e.g., "is between", "is not between", etc.) require two threshold values. Additionally or alternatively, a plurality of tags can have one rule. In the exemplary embodiment illustrated in FIG. 8, the alert is configured to notify the user (e.g., via mobile applications executing on mobile computing devices, web application executing on a computing device, etc.) when a data value for the humidity tag is not equal to a user-defined value. Other conditions include, but are not limited to, the data value being greater than the user-defined value, the data value being greater than or equal to the user-defined value, the data value being equal to the user-defined value, the data value being less than the user-defined value, the data value being less than or equal to the user-defined value, the data value being not between a user-defined value range, the data value being between a user-defined value range, and the like.

Figure 9:
FIG. 9 is a screenshot illustrating an exemplary graphical display including time ranges for retrieving historian data according to an embodiment.

FIG. 9 illustrates an exemplary GUI display 900 including selectable time ranges 902 for the query time period as further described herein. In an embodiment, GUI display 900 is generated in response to selection of a time range button 604 (FIG. 6). Via the GUI display 900 and a display device (e.g., touchscreen of a mobile computing device, display of a laptop computing device, etc.), aspects of the present disclosure are configured to receive a selection of one or more time ranges 902 and in response retrieve data from managed historian 102 and generate a display (e.g., display 300, 400, 500, etc.) including trend charts and/or channels for the selected time ranges.

Figure 10:
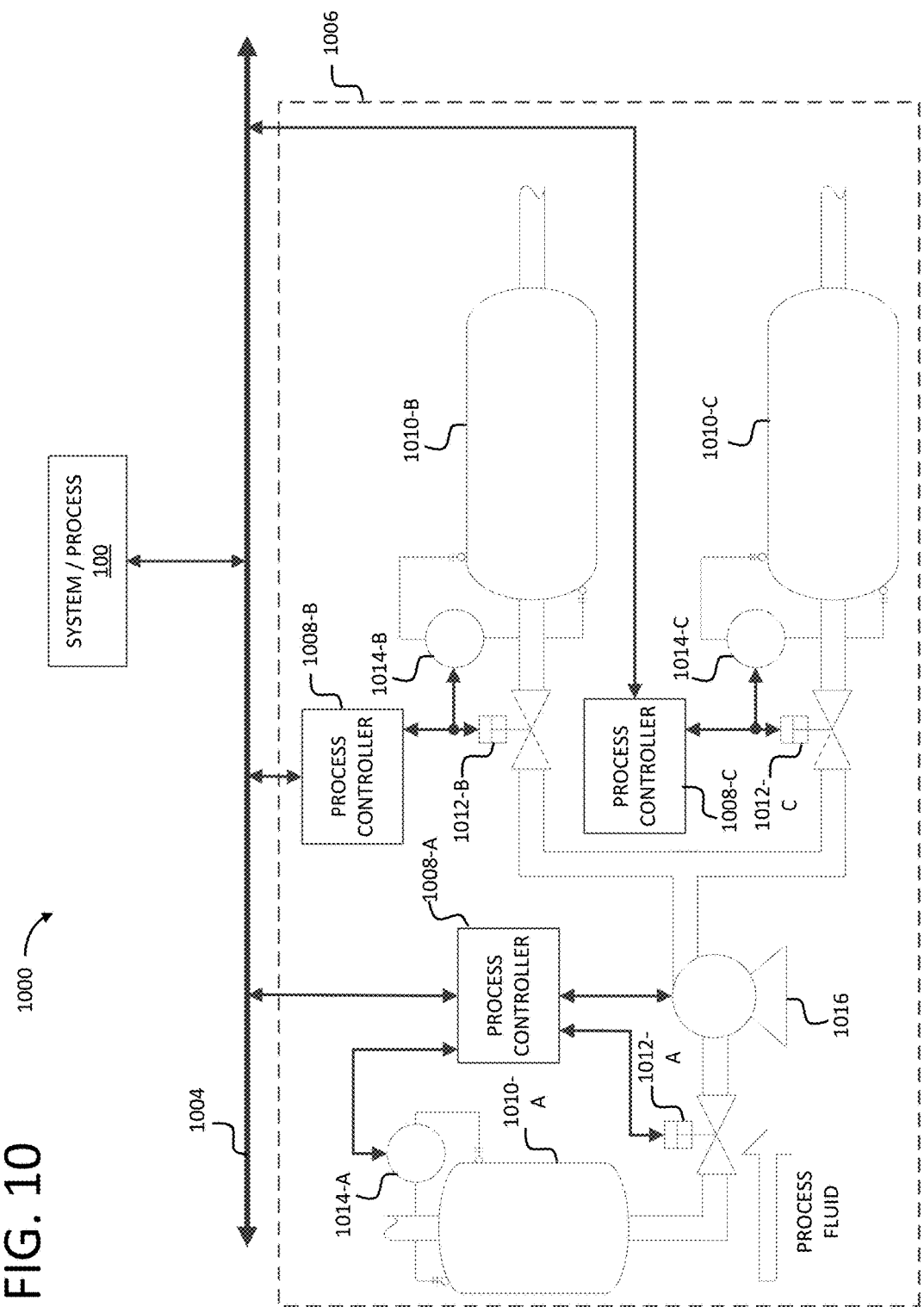
FIG. 10 illustrates an exemplary industrial process system within which aspects of the disclosure is incorporated according to an embodiment.

FIG. 10 illustrates an exemplary system, generally indicated at 1000, within which an embodiment of the disclosure may be incorporated. The system 1000 includes the system and process 100 for generating a GUI display of time series data, a communications infrastructure 1004, and an exemplary plant, such as a fluid processing system 1006. As illustrated, the fluid processing system 1006 includes process controllers 1008, tanks 1010, valves 1012, sensors 1014, and a pump 1016. In an embodiment, the system and process 100, the communications infrastructure 1004, the process controllers 1008, and the sensors 1014 comprise a supervisory control and data acquisition (SCADA) system. In system 1000, system and process 100, process controllers 1008, the tanks 1010, the valves 1012, sensors 1014, and the pump 1016 are communicatively coupled via communications infrastructure 1004.

The communications infrastructure 1004 is capable of facilitating the exchange of data among various components of system 1000, including system and process 100 and components of fluid processing system 1006 (e.g., process controllers 1008, valves 1012, sensors 1014, etc.). The communications infrastructure 1004 in the embodiment of FIG. 10 includes a local area network (LAN) that is connectable to other telecommunications networks, including other LANs or portions of the Internet or an intranet. The communications infrastructure 1004 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 1004 is any medium that allows data to be physically transferred through serial or parallel communication channels (e.g., copper wire, optical fiber, computer bus, wireless communication channel, etc.). In an embodiment, communications infrastructure 1004 comprises at least in part a process control network. In another embodiment, communications infrastructure 1004 comprises at least in part a SCADA system.

Still referring to FIG. 10, the fluid processing system 1006 is adapted for changing or refining raw materials to create end products. It will be apparent to one skilled in the art that aspects of the present disclosure are capable of optimizing processes and processing systems other than fluid processing system 1006 and that system 1006 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 1008 provide an interface or gateway between components of fluid processing system 1006 (e.g., valves 1012, sensors 1014, pump 1016) and other components of system 1000. In another embodiment, components of fluid processing system 1006 communicate directly with system and process 100 via communications infrastructure 1004. In yet another embodiment, process controllers 1008 transmit data to and receive data from system and process 100, valves 1012, sensors 1014, and/or pump 1016 for controlling and/or monitoring various aspects of fluid processing system 1006.

The process controllers 1008 of FIG. 10 are adapted to control and/or monitor aspects of fluid processing system 1006. In an embodiment, processor controllers 1008 are programmable logic controllers (PLC) that control and collect data from aspects of fluid processing system 1006. In another embodiment, process controllers 1008 are adapted to execute real-time applications that receive configuration data values and real-time data values from system and process 100, as further described herein.

Figure 11:
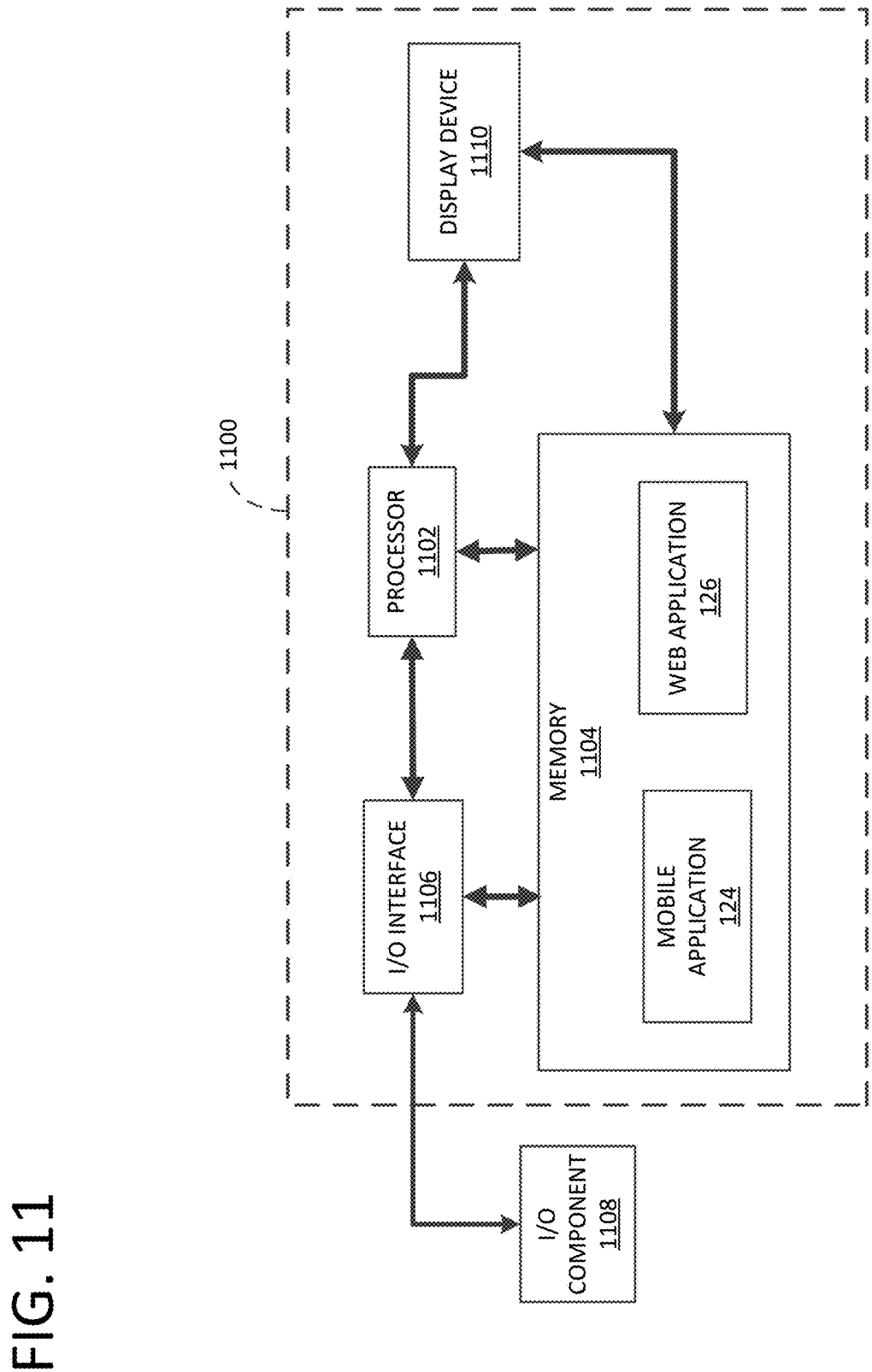
FIG. 11 is a block diagram of an exemplary computing device architecture within which aspects of the disclosure is implemented according to an embodiment.

FIG. 11 illustrates an exemplary architecture of a computing device 1100 (e.g., mobile computing device, tablet computing device, desktop computing device, smartphone, etc.) programmed to provide aspects of the systems and processes described herein via a software environment. In this embodiment, the computing device 1100 includes a processor 1102, a memory 1104, an input/output (I/O)

interface 1106 that interfaces with an I/O component 1108, and a display device 1110. The memory 1104 includes mobile applications 124 and/or web application 126 each embodied in processor-executable instructions for executing by processor 1102. In this manner, the computing device 1100 comprises a special-purpose computing device for adapting database queries for automated generation of graphical displays in accordance with an aspect of the disclosure.

The processor 1102, memory 1104, I/O interface 1106, and display device 1110 are communicatively connected and/or electrically connected to each other. The I/O interface 1106 is communicatively and/or electrically connected to the I/O component 1108. The processor 1102 is adapted to execute processor-executable instructions stored in the memory 1104 for retrieving data from managed historian 102 and generating graphical displays in real time. The I/O interface 1106 of FIG. 11 provides a physical data connection between the computing device 1100 and I/O component 1108. In an embodiment, I/O interface 1106 is a network interface card (NIC) or modem and I/O component 1108 is a telecommunications network (e.g., communications network 1004). In another embodiment, display device 1110 is a touchscreen of a smartphone, tablet computing device, or the like.

In an embodiment, computing device 1100 comprises an automated graphical display generation system that includes display device 1110, processor 1102, and processor-executable instructions (e.g., mobile applications 124, web application 126, etc.) stored on memory 1104. When executed by processor 1102, the instructions generate GUI display 300 on display device 1110. The computing device 1100 receives a query time period selection via GUI display 900 on display device 1110. Time-weighted average data values, minimum data values, and maximum data values are retrieved from managed historian 102 communicatively coupled to computing device 1100 via communications network 1004. Each retrieved time-weighted average data value represents a time-weighted average of data values captured during each of a plurality of intervals of the selected query time period. Each retrieved minimum data value represents a minimum data value captured during each interval and each retrieved maximum data value represents a maximum data value captured during each interval. In response to retrieving the time-weighted average data values, the minimum data values, and the maximum data values, the computing device 1100 generates a graphical user interface on display device 1110. The generated graphical user interface includes time-weighted average trend chart 302, minimum trend chart 306, and maximum trend chart 304. Additionally or alternatively, the instructions, when executed by processor 1102, generate GUI display 300 on display device 1110 further including maximum trend channel 308 and/or minimum trend channel 310.

In another embodiment, computing device 1100 comprises an automated graphical display generation system that includes display device 1110, processor 1102, and processor-executable instructions (e.g., mobile applications 124, web application 126, etc.) stored on memory 1104. When executed by processor 1102, the instructions generate GUI display 400 on display device 1110. The computing device 1100 receives a query time period selection via GUI display 900 and a first tag selection and a second tag selection via GUI display 600 of display device 1110. The first and second tags 602 are each one of a plurality of tags of managed historian 102. The received query time period 902 is divided into intervals and the number of intervals is based upon a display resolution of display device 1110. A first time-weighted average data value, a first minimum data value, and a first maximum data value for each interval are each retrieved from managed historian 102 via communications network 1004. Each retrieved first time-weighted average data value represents a time-weighted average of the data values for the first tag captured during the interval. Each retrieved first minimum data value represents a minimum data value for the first tag captured during the interval. Each retrieved first maximum data value represents a maximum data value for the first tag captured during the interval. A second time-weighted average data value, a second minimum data value, and a second maximum data value for each interval are each retrieved from the industrial process historian via the communications network. Each retrieved second time-weighted average data value represents a time-weighted average of the data values for the second tag captured during the interval. Each retrieved second minimum data value represents a minimum data value for the second tag captured during the interval. Each retrieved second maximum data value represents a maximum data value for the second tag captured during the interval. In response to retrieving the first time-weighted average data values, the first minimum data values, the first maximum data values, the second time-weighted average data values, the second minimum data values, and the second maximum data values, computing device 1100 generates GUI display 400 on display device 1110. The GUI display 400 includes first average trend chart 402 for the retrieved first time-weighted average data values, first minimum trend chart 406 for the retrieved first minimum data values, first maximum trend chart 404 for the retrieved first maximum data values, second average trend chart 412 for the retrieved second time-weighted average data values, second minimum trend chart 416 for the retrieved second minimum data values, and second maximum trend chart 414 for the retrieved second maximum data values. The first average trend chart 402, first minimum trend chart 406, and first maximum trend chart 404 have a first color (e.g., blue) on the graphical display, and the second average trend chart 412, second minimum trend chart 416, and second maximum trend chart 414 have a second color (e.g., red) on the graphical display.

In addition to the embodiments described above, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An automated graphical display generation system comprising:
   a display device;
   at least one processor; and
   one or more processor-executable instructions stored on at least one computer-readable storage medium of the automated graphical display generation system, said processor-executable instructions including instructions that, when executed by the at least one processor:
   receive a query time period selection via a query graphical user interface of the display device;
   retrieve a plurality of time-weighted average data values from an industrial process historian device communicatively coupled to the automated graphical display generation system via a communications network, each retrieved time-weighted average data value representing a time-weighted average of data values captured during each of a plurality of intervals of the query time period;
   retrieve a plurality of minimum data values from the industrial process historian device via the communications network, each retrieved minimum data value representing a minimum data value captured during each interval;
   retrieve a plurality of maximum data values from the industrial process historian device via the communications network, each retrieved maximum data value representing a maximum data value captured during each interval; and
   generate, in response to said retrieving the time-weighted average data values, the minimum data values, and the maximum data values, a graphical user interface on the display device comprising:
      a time-weighted average trend line for the retrieved time-weighted average data values;
      a minimum trend line for the retrieved minimum data values; and
      a maximum trend line for the retrieved maximum data values.

2. The automated graphical display generation system of claim 1, further comprising processor-executable instructions stored on the at least one computer-readable storage medium that, when executed by the at least one processor, generate an alert notification on the graphical user interface when at least one of the retrieved minimum data values and retrieved maximum data values exceeds a predetermined threshold value.

3. The automated graphical display generation system of claim 1, wherein the time-weighted average trend line, the minimum trend line, and the maximum trend line have a first color.

4. The automated graphical display generation system of claim 3, wherein the minimum trend line and the maximum trend line are paler than the time-weighted average trend line.

5. The automated graphical display generation system of claim 3, further comprising processor-executable instructions stored on the at least one computer-readable storage medium that, when executed by the at least one processor, generate on the graphical user interface:
   a minimum trend channel between the minimum trend line and the time-weighted average trend line, and
   a maximum trend channel between the maximum trend line and the time-weighted average trend line,
   wherein the minimum trend channel and the maximum trend channel are each filled with the first color and are paler than the time-weighted average trend line.

6. The automated graphical display generation system of claim 1, wherein the number of intervals is between about 120 and 250.

7. The automated graphical display generation system of claim 1, wherein the display comprises a static display window.

8. A computer-implemented method comprising:
   receiving a query time period via a graphical user interface of a display device;
   dividing the received query time period into intervals, wherein the number of intervals is dependent upon a display resolution of the display device;
   retrieving a time-weighted average data value for each interval from an industrial process historian device via a communications network, wherein each retrieved time-weighted average data value represents a time-weighted average of the data values captured during the interval;
   retrieving a minimum data value for each interval from the industrial process historian device via the communications network;
   retrieving a maximum data value for each interval from the industrial process historian device via the communications network; and
   generating a display on the display device in response to said retrieving the time-weighted average data values, the minimum data values, and the maximum data values, the display comprising:
- a time-weighted average trend chart for the retrieved time-weighted average data values;
- a minimum trend chart for the retrieved minimum data values; and
- a maximum trend chart for the retrieved maximum data values.

9. The method of claim 8, further comprising generating an alert notification on the display when at least one of the retrieved minimum data values and the retrieved maximum data values exceeds a predetermined threshold value.

10. The method of claim 8, wherein the time-weighted average trend chart, the minimum trend chart, and the maximum trend chart have a first color.

11. The method of claim 10, wherein the time-weighted average trend chart has a first luminance and the minimum trend chart and the maximum trend chart have a second luminance.

12. The method of claim 11, wherein a first area on the display between the minimum trend chart and the time-weighted average trend chart is filled with the first color at the second luminance, and wherein a second area on the display between the maximum trend chart and the time-weighted average trend chart is filled with the first color at the second luminance.

13. The method of claim 8, wherein the number of intervals is between about 120 and 250.

14. The method of claim 8, wherein the display comprises a static window.

15. A computer readable storage device having processor readable instructions stored thereon including instructions that, when executed by a processor, implement a method of automatically generating a graphical display for time series data, comprising:
- receiving a query time period selection via a graphical user interface of a display device;
- receiving a first tag selection via the graphical user interface of the display device, wherein the first tag is one of a plurality of tags of an industrial process historian;
- receiving a second tag selection via the graphical user interface of the display device, wherein the second tag is one of the plurality of tags of the industrial process historian;
- dividing the received query time period into intervals, wherein the number of intervals is based upon a display resolution of the display device;
- retrieving a first time-weighted average data value for each interval from the industrial process historian via a communications network, each retrieved first time-weighted average data value representing a time-weighted average of the data values for the first tag captured during the interval;
- retrieving a first minimum data value for each interval from the industrial process historian via the communications network, each retrieved first minimum data value representing a minimum data value for the first tag captured during the interval;
- retrieving a first maximum data value for each interval from the industrial process historian via the communications network, each retrieved first maximum data value representing a maximum data value for the first tag captured during the interval;
- retrieving a second time-weighted average data value for each interval from the industrial process historian via the communications network, each retrieved second time-weighted average data value representing a time-weighted average of the data values for the second tag captured during the interval;
- retrieving a second minimum data value for each interval from the industrial process historian via the communications network, each retrieved second minimum data value representing a minimum data value for the second tag captured during the interval;
- retrieving a second maximum data value for each interval from the industrial process historian via the communications network, each retrieved second maximum data value representing a maximum data value for the second tag captured during the interval; and
- generating a graphical display on the display device in response to said retrieving the first time-weighted average data values, the first minimum data values, the first maximum data values, the second time-weighted average data values, the second minimum data values, and the second maximum data values, the graphical display comprising:
  - a first time-weighted average trend chart for the retrieved first time-weighted average data values;
  - a first minimum trend chart for the retrieved first minimum data values;
  - a first maximum trend chart for the retrieved first maximum data values;
  - a second time-weighted average trend chart for the retrieved second time-weighted average data values;
  - a second minimum trend chart for the retrieved second minimum data values; and
  - a second maximum trend chart for the retrieved second maximum data values;
  - wherein the first time-weighted average trend chart, the first minimum trend chart, and the first maximum trend chart have a first color on the graphical display, and
  - wherein the second time-weighted average trend chart, the second minimum trend chart, and the second maximum trend chart have a second color on the graphical display.

16. The computer readable storage device of claim 15, further comprising processor readable instructions stored thereon that, when executed by a processor implement the method of automatically generating a graphical display for time series data, further comprising generating an alert notification on the graphical display when at least one of the retrieved first minimum data values, first maximum data values, second minimum data values, and second maximum data values exceeds a predetermined threshold value.

17. The computer readable storage device of claim 15, wherein the first minimum trend chart and the first maximum trend chart are paler than the first time-weighted average trend chart, and wherein the second minimum trend chart and the second maximum trend chart are paler than the second time-weighted average trend chart.

18. The computer readable storage device of claim 15, further comprising processor readable instructions stored thereon that, when executed by a processor implement the method of automatically generating a graphical display for time series data, further comprising generating on the graphical display:
- a first minimum trend channel between the first minimum trend chart and the first time-weighted average trend chart,
- a first maximum trend channel between the first maximum trend chart and the first time-weighted average trend chart, a second minimum trend channel between the second minimum trend chart and the second time-weighted average trend chart, and a second maximum trend channel between the second maximum trend chart and the second time-weighted average trend chart, wherein the first minimum trend channel and the first maximum trend channel are each filled with the first color and are paler than the first time-weighted average trend line, and wherein the second minimum trend channel and the second maximum trend channel are each filled with the second color and are paler than the second time-weighted average trend line.

19. The computer readable storage device of claim 15, wherein the number of intervals is between about 120 and 250.

20. The computer readable storage device of claim 15, wherein graphical display comprises a static display window.

\* \* \* \* \*